UNITED STATES PATENT OFFICE.

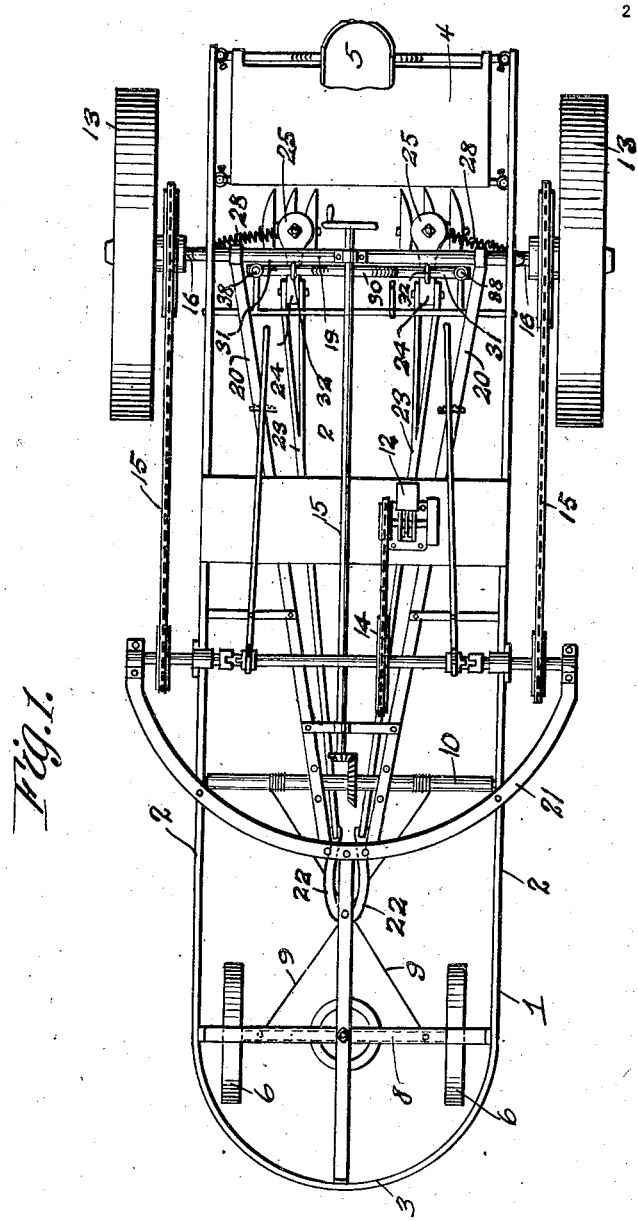

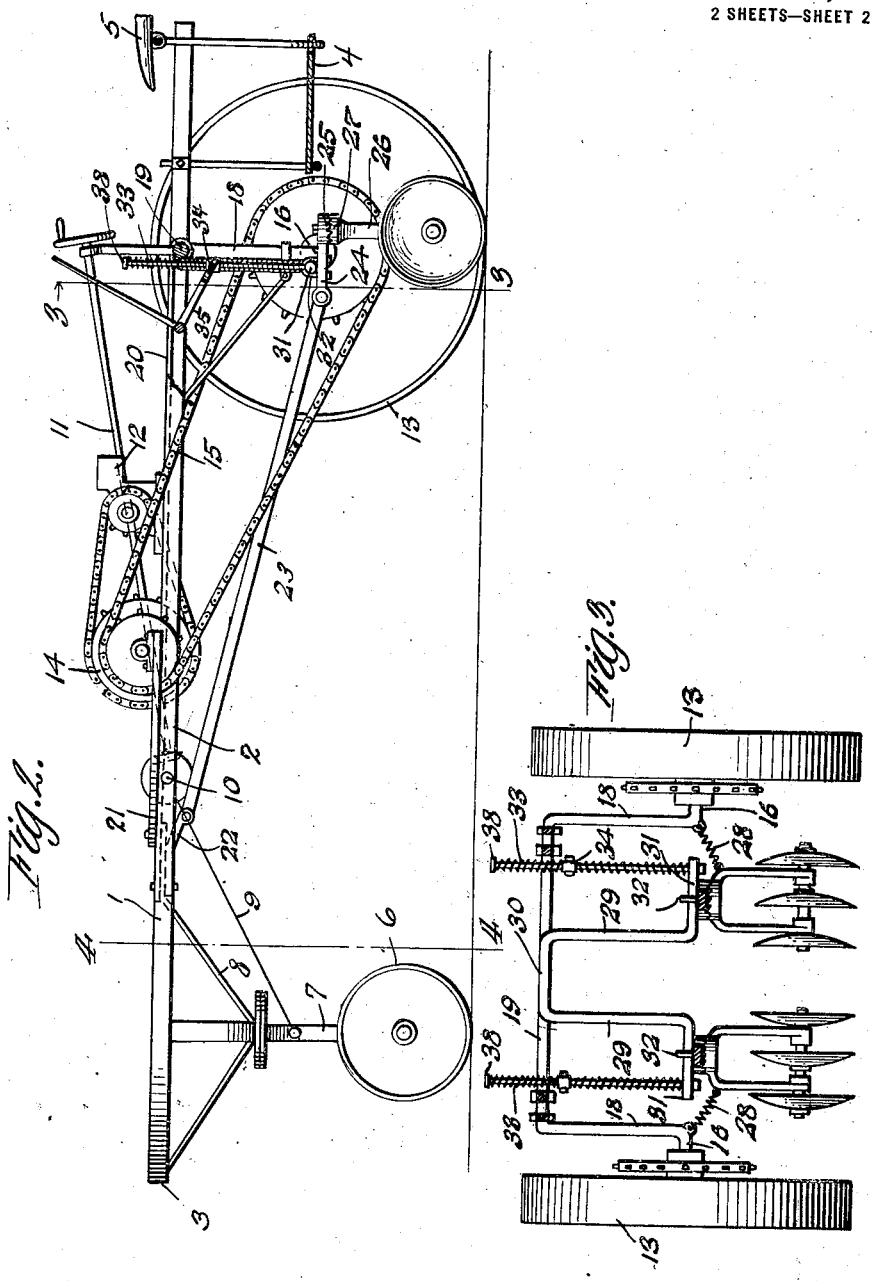

MAURA F. WATKINS, OF STAR LIME WORKS, KENTUCKY.

CULTIVATOR.

1,421,872. Specification of Letters Patent. Patented July 4, 1922.

Application filed November 4, 1918. Serial No. 261,052.

*To all whom it may concern:*

Be it known that I, MAURA F. WATKINS, a citizen of the United States, residing at Star Lime Works, in the county of Lyon and State of Kentucky, have invented certain new and useful Improvements in a Cultivator, of which the following is a specification.

This invention relates to farming implements and more particularly to an improved motor driven cultivator adapted to be operated by one person, the mechanism being arranged so that the operator can conveniently guide the cultivator and adjust the various parts of the mechanism as desired.

One of the objects of the invention is to provide an improved cultivator having the ground working implement suspended therefrom in an improved manner and arranged to be adjusted by the operator of the cultivator so that the earth-working members may be disposed in the proper position for accomplishing the desired result.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the device constructed in accordance with my invention.

Figure 2 is a side elevation, parts being broken away to more clearly disclose the construction.

Figure 3 is a section taken on the line 3—3 of Fig. 2.

Referring to the drawings, wherein is illustrated the preferred form of my invention, in which like numerals of reference indicate like or corresponding parts throughout the several views, the portable frame 1 consists of the parallel side bars 2 connected together at their forward end by the curved frame bar 3. Suspended from the rear ends of the side frame bars 2 is a platform 4 and the operator's seat 5 is arranged adjacent to the platform so that the operator of the vehicle may either stand upon the platform or be seated as desired. The forward end of the frame 1 is supported upon any of the usual and appropriate type of truck as indicated at 6, 7 and 8; any suitable steering arrangement, such as indicated at 9, 10 and 11, being adapted for guiding the cultivator in its travel between the rows. A motor 12, supported approximately intermediate the ends of the frame 1, furnishes the motive power for the cultivator, which power may be transmitted to the rear wheels 13 thereof by any practical arrangement of sprockets and drive chains such as indicated at 14 and 15.

The wheels are mounted upon the spindles 16 formed by outwardly turned portions of the arched axle which includes the upright supporting members 18 fastened to the side frame bars and connected together by the cross rod 19, which forms a part of the arched axle and supports the frame at the rear end. This bar 19 is also connected to the rear ends of the diverging brace bars 20 the forward ends of which are fastened to the central portion of an arcuate supporting member 21.

A yoke member including side arms 22, is pivotally connected to a portion of the front supporting bracket 8 and the end of each arm 22 is bifurcated to receive one end of either of the pull bars 23 which extend rearwardly and downwardly and have their rear ends bifurcated as shown to advantage in Fig. 1. These arms 23 being pivotally connected to the arms 22, are permitted to swing vertically and the bifurcated rear ends are pivotally connected to the attaching members, 24 which carry the cultivators. These members 24 include the forwardly projecting arms which have their rear ends provided with disk portions 25, the lower faces of which are corrugated. Each earth-working member comprises the yoke 26 which includes side arms connected at their upper ends by a disk portion 27 the upper surface of which is also corrugated to engage the corrugated surface of the disk portion 25. A bolt passes through the two disk portions 25 and 27 so that these members may be held in rigid relation while the device is in use and it will be obvious from this construction that any appropriate type of earth-working implement may be substituted for the cultivator disks shown in the present illustration. The yoke members 26 are each connected to the arched axle by a coil spring 28 to relieve the strain on the pulling bars while the apparatus is in use.

A lift bar is attached to the members 24 and is adapted to straddle the growing plant as shown in Fig. 3 and for this reason is substantially U-shaped so that the vertical portions 29 are laterally spaced apart and have their upper ends connected by the portion 30 while the lower ends are provided with oppositely extending projections 31, each of which is connected to one of the attaching members by a fastening element 32. The terminals of the projections 31 are each connected to a lift rod 33 which has slidably mounted thereon a collar 34, each collar being pivotally connected to the short arm 35 of a handle lever, pivoted to one of the side frame bars 2 so as to be conveniently operated by the operator of the machine. The upper end of each lift rod is provided with a head 38 and two coil springs are provided on each lift rod. One coil spring is interposed between the head 38 and the collar 34 while the lower coil spring is interposed between the collar 34 and the projection 31. This arrangement causes the collar to be maintained at approximately the center of each lift rod and the springs are sufficiently stiff to permit the operator to lift the ground engaging element when the lever 35 is operated but are also sufficiently resilient to permit the ground engaging element to pass easily over any obstruction in their path without undue shock.

The foregoing description and accompanying drawings have reference to what might be considered to be the preferred or approved form of my invention. I desire it to be understood that I may make such changes in the construction, combination and arrangement of parts, materials, dimensions et cetera, as may prove expedient and fall within the scope of the appended claim.

Having thus fully described my invention what I claim as new and desire to secure by Letters Patent, is:—

In a cultivator, a frame, an arch bar axle supporting the rear end of said frame, an arch bar for carrying cultivator elements positioned adjacent the first mentioned arch bar and having its lower ends turned outwardly, cultivator elements supporting members secured beneath said lower ends and extending rearwardly and forwardly of said lower ends, pull bars each having one end pivoted to the forward part of the frame and its other end pivoted to the forward end portion of a respective supporting member, lift rods connected to the second arch bar adjacent its extremities, pivoted lift levers each having the usual connection with a respective lift rod, blade carrying yokes each connected to the rear end of a respective cultivator element supporting member and springs each connecting one of said yokes with the arch bar axle, said springs being arranged to hold the second arch bar and its connecting parts yieldably in a position central of the arch bar axle.

In testimony whereof I affix my signature in presence of two witnesses.

MAURA F. WATKINS.

Witnesses:
 E. W. WATKINS,
 D. C. FULKS.